(12) United States Patent
Yoshida et al.

(10) Patent No.: US 12,092,144 B2
(45) Date of Patent: Sep. 17, 2024

(54) FASTENER, FASTENING STRUCTURE, AND METHOD OF DESIGNING FASTENER

(71) Applicant: MITSUBISHI HEAVY INDUSTRIES, LTD., Tokyo (JP)

(72) Inventors: Kohei Yoshida, Tokyo (JP); Kazuhiro Miura, Tokyo (JP); Takeshi Fujita, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 209 days.

(21) Appl. No.: 17/901,169

(22) Filed: Sep. 1, 2022

(65) Prior Publication Data
US 2023/0080323 A1   Mar. 16, 2023

(30) Foreign Application Priority Data
Sep. 15, 2021 (JP) .................................. 2021-150594

(51) Int. Cl.
*F16B 37/04* (2006.01)

(52) U.S. Cl.
CPC ............ *F16B 37/045* (2013.01); *F16B 37/04* (2013.01); *F16B 2200/10* (2018.08)

(58) Field of Classification Search
CPC ........ F16B 37/00; F16B 37/04; F16B 37/045; F16B 39/08; F16B 39/10; F16B 39/24; F16B 43/00; F16B 2200/10; Y10S 411/924
USPC ........... 411/81, 84, 85, 190–191, 337, 366.1, 411/427, 432, 517
See application file for complete search history.

(56) References Cited

U.S. PATENT DOCUMENTS

| | | | | | |
|---|---|---|---|---|---|
| 3,368,443 | A | * | 2/1968 | Faul ....................... | F16B 37/00 411/919 |
| 4,763,456 | A | * | 8/1988 | Giannuzzi ............. | E04D 3/3603 411/533 |
| 4,799,845 | A | * | 1/1989 | Hrysko ................... | E04D 5/143 411/908 |
| 4,808,050 | A | * | 2/1989 | Landt .................... | F16B 39/282 411/184 |
| 5,102,275 | A | * | 4/1992 | Hulsey .................. | E04D 3/3603 411/533 |

(Continued)

FOREIGN PATENT DOCUMENTS

| | | |
|---|---|---|
| JP | 2001-159410 A | 6/2001 |
| JP | 2018-183903 A | 11/2018 |

(Continued)

*Primary Examiner* — Roberta S Delisle
(74) *Attorney, Agent, or Firm* — BIRCH. STEWART, KOLASCH & BIRCH, LLP

(57) ABSTRACT

Provided are a fastener that can reduce the fastener weight, decrease body shear fracture, and avoid slip of a nut part and damage of the body due to the slip. The fastener includes: a metal nut part into which a bolt is screwed along an axis; and a resin body in which the nut part is inserted, the nut part includes an internal thread part into which the bolt is screwed from one end to another, a plate-like flange part connected to a side of the other end of the internal thread part and having a flange face perpendicular to the axis, and an erected part arranged at a position apart from the internal thread part radially about the axis and erected axially from the flange face, and the internal thread part and the erected part are inserted in the body.

8 Claims, 17 Drawing Sheets

(56) References Cited

U.S. PATENT DOCUMENTS

| | | | | |
|---|---|---|---|---|
| 5,419,524 | A * | 5/1995 | Evans | B60S 9/02 |
| | | | | 248/346.4 |
| 6,282,857 | B1 * | 9/2001 | Rubenacker | E04D 5/145 |
| | | | | 411/537 |
| 7,394,009 | B2 * | 7/2008 | Judd | G10D 13/28 |
| | | | | 84/411 R |
| 10,006,481 | B2 * | 6/2018 | Tomatsu | F16B 37/005 |
| 2002/0172573 | A1 * | 11/2002 | Pamer | G11B 5/102 |
| 2012/0243960 | A1 * | 9/2012 | Ivinson | F16B 37/145 |
| | | | | 411/427 |
| 2015/0328849 | A1 * | 11/2015 | Rosemann | B29C 45/0001 |
| | | | | 264/328.12 |
| 2018/0363691 | A1 | 12/2018 | Gunner et al. | |

FOREIGN PATENT DOCUMENTS

| | | |
|---|---|---|
| JP | 2020-524098 A | 8/2020 |
| WO | WO 2018/236817 A1 | 12/2018 |

\* cited by examiner

FASTENER, FASTENING STRUCTURE, AND METHOD OF DESIGNING FASTENER

CROSS-REFERENCE TO RELATED APPLICATIONS

This application claims the benefit of priority to Japanese Patent Application Number 2021-150594 filed on Sep. 15, 2021. The entire contents of the above-identified application are hereby incorporated by reference.

BACKGROUND

1. Technical Field

The present disclosure relates to a fastener, a fastening structure, and a method of designing a fastener.

2. Description of Related Art

For example, a plurality of panels forming a floor panel of a vehicle are integrated by inserting and fastening bolts through the panels in a support member (a fastener) arranged across adjacent panels.

While the support member is made of metal for ensuring strength, the weight increases if the whole part thereof is made of metal.

Accordingly, another configuration is considered by use of a nut mounted on an additive manufacturing (AM) member through a thread part to integrate a plurality of members, as with a fastening structure disclosed in Japanese Patent Application Laid-Open No. 2020-524098.

Japanese Patent Application Laid-Open No. 2020-524098 is an example of the related art.

However, in the configuration disclosed in Japanese Patent Application Laid-Open No. 2020-524098, shear fracture is likely to occur in the AM member due to a pull-out load caused by the bolt, and slip of the nut is also likely to occur because of an insufficient resistance against fastening torque of the bolt.

BRIEF SUMMARY

The present disclosure has been made in view of such circumstances, and an object is to provide a fastener, a fastening structure, and a method of designing a fastener that can reduce the weight of the fastener, decrease shear fracture of a body, and avoid slip of a nut part and damage of the body due to the slip To achieve the above object, a fastener, a fastening structure, and a method of designing a fastener of the present disclosure employ the following solutions.

A fastener according one aspect of the present disclosure includes: at least one metal nut part into which a bolt is screwed along an axis; and a resin body in which the nut part is inserted, and the nut part includes an internal thread part into which the bolt is screwed from one end to another end, a plate-like flange part connected to a side of the other end of the internal thread part and having a flange face perpendicular to the axis, and at least one erected part arranged at a position spaced apart from the internal thread part in a radial direction about the axis and erected in a direction of the axis from the flange face, and the internal thread part and the erected part of the nut part are inserted in the body.

Further, a fastening structure according to one aspect of the present disclosure includes: the fastener in which a plurality of nut parts are inserted in a body; a plurality of panels arranged on the fastener; and a plurality of bolts, and one of the plurality of panels is fastened to one of the plurality of nut parts by one of the plurality of bolts.

Further, a method of designing the fastener according to one aspect of the present disclosure is a method of designing the fastener described above, and the method includes: deriving a parameter required for the fastener; selecting a metal material and a molding method for the nut part that meet the parameter; and selecting a resin material and a molding method for the body that meet the parameter.

According to the present disclosure, it is possible to reduce the weight of the fastener, decrease shear fracture of the body, and avoid slip of the nut part and damage of the body due to the slip.

DETAILED DESCRIPTION

A fastener, a fastening structure, and a method of designing a fastener according to one embodiment of the present disclosure will be described below with reference to the drawings.

[Overview of Fastener Etc.]

First, the overview of a fastener 10 etc. will be described.

Figure 1:
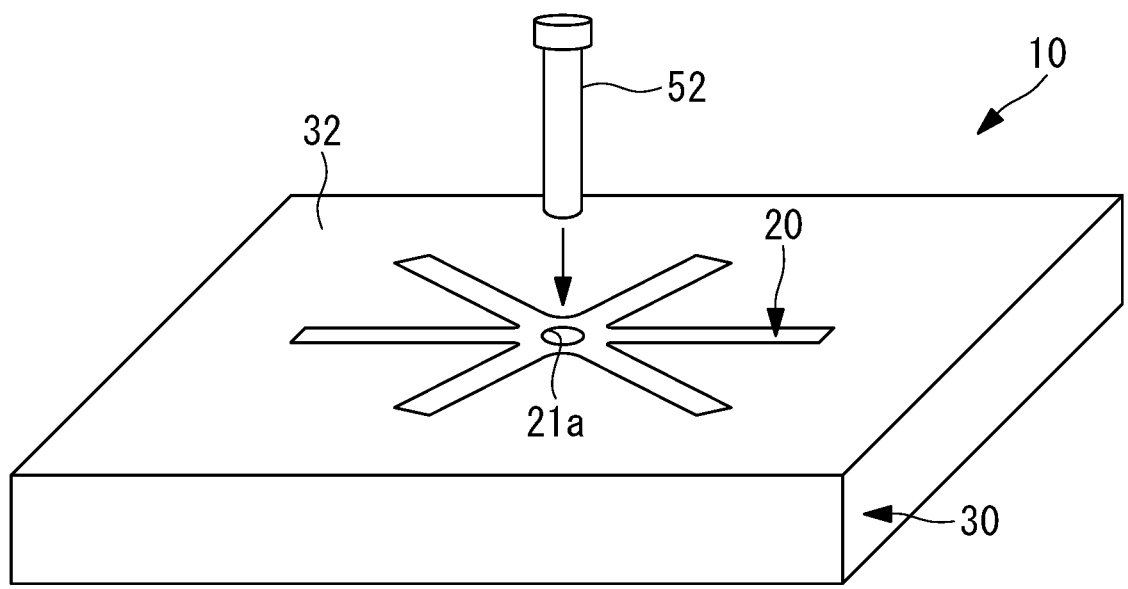
FIG. 1 is a perspective view of a fastener according to one embodiment of the present disclosure.

As illustrated in FIG. 1, the fastener 10 is a component including a nut part 20 and a body 30.

The nut part 20 is inserted in the body 30.

An internal thread 21a is formed in the nut part 20 and is configured such that a bolt 52 is screwed into the internal thread 21a.

The detailed configuration of the nut part 20 and the body 30 will be described later.

Figure 2:
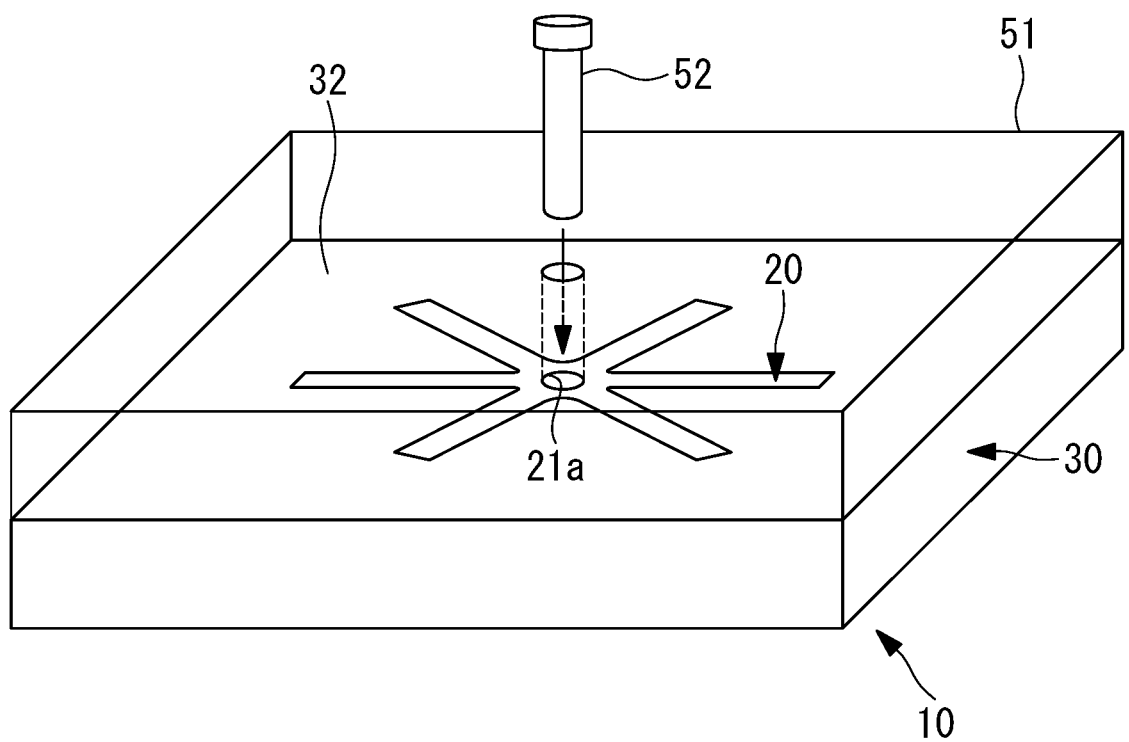
FIG. 2 is a perspective view of a state where a panel is arranged on the fastener according to one embodiment of the present disclosure.

As illustrated in FIG. 2, a plate-like panel 51 is arranged on the top face of the fastener 10 (the top face 32 of the body 30).

Further, when the bolt 52 is screwed into the internal thread 21a of the fastener 10 via the panel 51 and fastened by predetermined torque, the panel 51 can be fixed (fastened) to the fastener 10.

Figure 3:
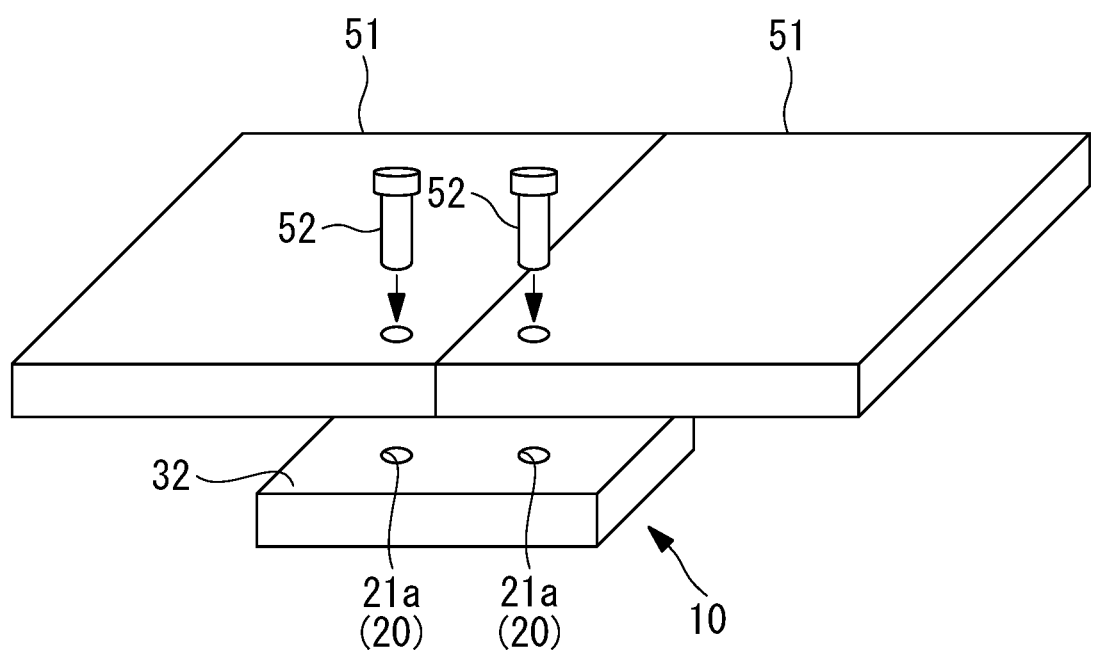
FIG. 3 is a perspective view of a state where a plurality of panels are arranged on the fastener according to one embodiment of the present disclosure.

As illustrated in FIG. 3, in the fastener 10, a plurality of nut parts 20 are typically inserted in a single body 30. In the case of FIG. 3, two nut parts 20 are inserted in the single body 30.

Note that, for the fastener 10 illustrated in FIG. 3, only the internal thread 21a formed in the nut parts 20 and the body 30 are illustrated, and other portions are omitted.

A plurality of panels 51 are arranged on the top face of the fastener 10 (the top face 32 of the body 30) having the plurality of nut parts 20 (internal thread parts 21).

Figure 4:
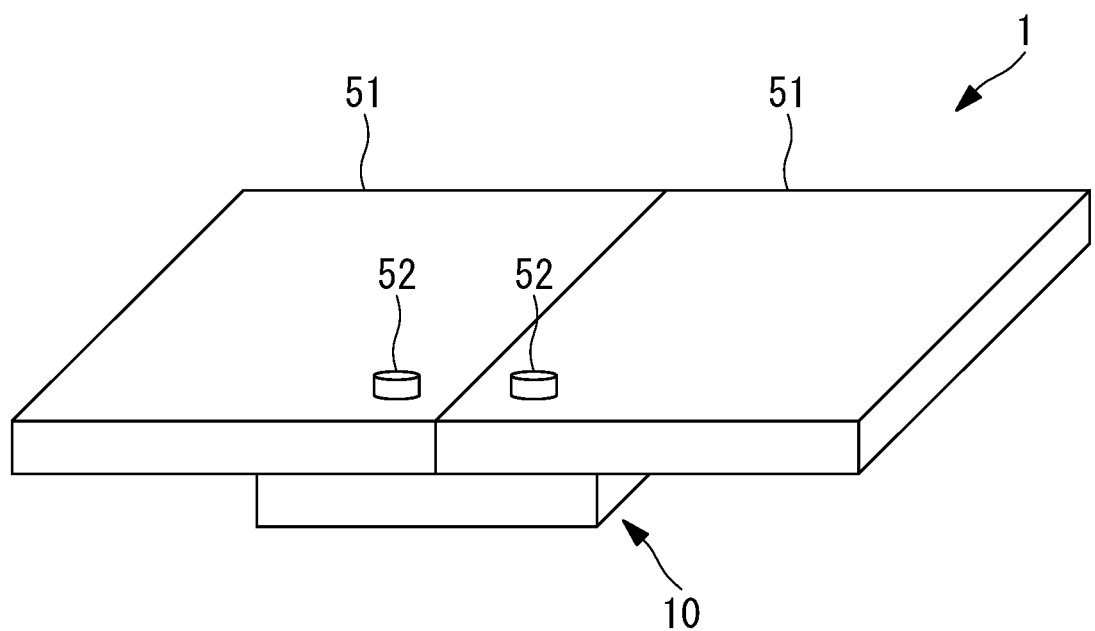
FIG. 4 is a perspective view illustrating a fastening structure according to one embodiment of the present disclosure.

Further, as illustrated in FIG. 4, each of the panels 51 is fixed to the single common fastener 10, and thereby different panels 51 can be integrated with each other to form a fastening structure 1.

A component to which the fastening structure 1 is applied may be, for example, a floor of a vehicle or an electric equipment cover of a manipulator (a hand tool).

When the fastening structure 1 is applied to a floor of a vehicle, the panel 51 serves as a floor panel. Further, when the fastening structure 1 is applied to an electric equipment cover, the panel 51 serves as a cover panel.

[Details of Fastener Etc.]

Next, the details of the fastener 10 etc. will be described.

As illustrated in FIG. 1, the fastener 10 includes the nut part 20 and the body 30.

The nut part 20 is made of a material (for example, metal such as a steel material) having a strength that is not damaged (not broken) earlier than the body 30.

The body 30 is made of resin (for example, an engineering plastic) or a fiber reinforced resin (for example, a glass-fiber reinforced resin or a carbon fiber reinforced resin).

Figure 5:
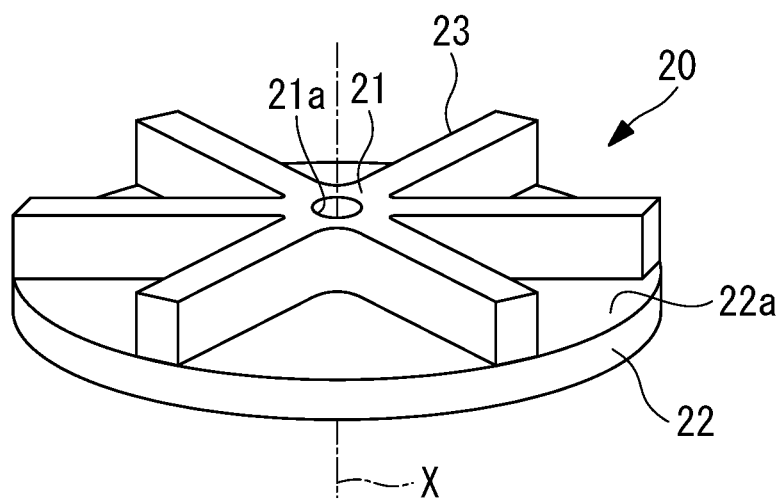
FIG. 5 is a perspective view of a nut part.
Figure 6:
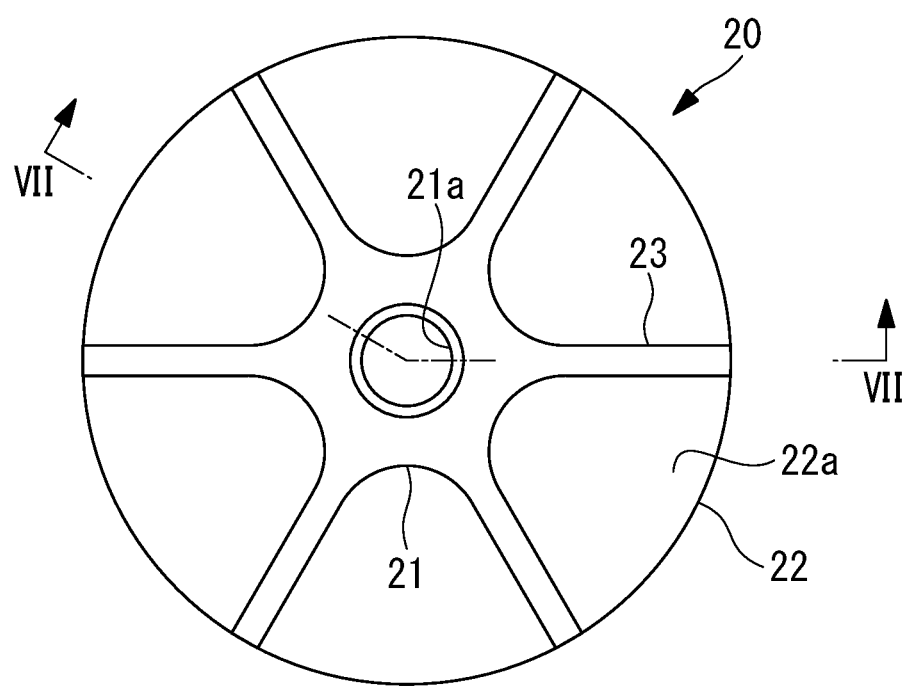
FIG. 6 is a plan view of the nut part.
Figure 7:
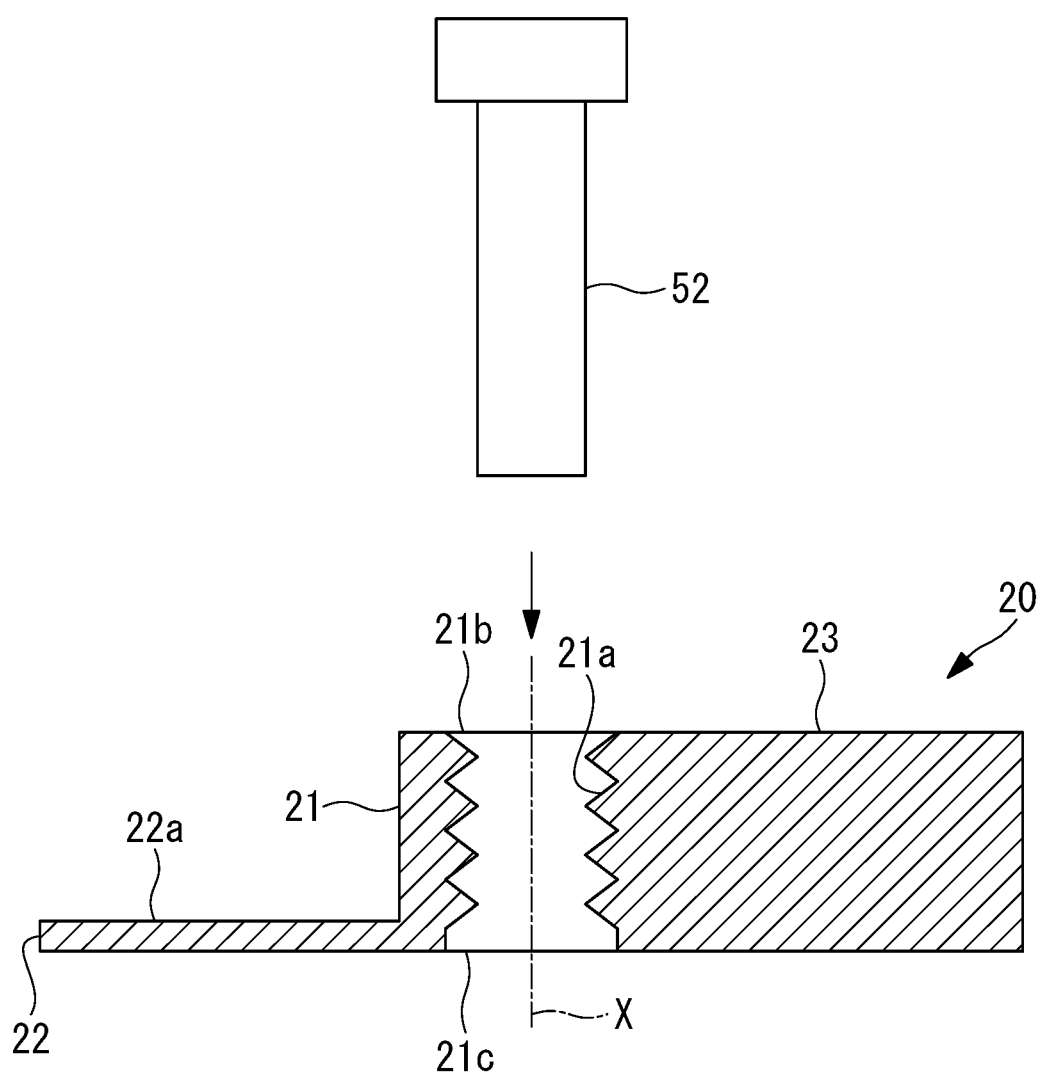
FIG. 7 is a longitudinal sectional view taken along a cutting line VII-VII illustrated in FIG. 6.

As illustrated in FIG. 5 to FIG. 7, the nut part 20 has a special form different from a general hexagon nut or the like.

Specifically, the nut part 20 has the internal thread part 21, a flange part 22, and erected parts 23. The internal thread part 21, the flange part 22, and the erected parts 23 are connected to and integrated with each other.

The internal thread part 21 is a portion where an internal thread 21a into which the bolt 52 is screwed is formed inside. The bolt 52 is screwed from one end 21b to the other end 21c of the internal thread part 21 along an axis X (see FIG. 7).

The flange part 22 is connected to and integrated with the side of the other end 21c of the internal thread part 21 (that is, the side on which an end of a shaft part of the bolt 52 is located).

The flange part 22 is a plate-like member having a flange face 22a perpendicular to the axis X. The flange face 22a is a face located on the top face of the flange part 22, and the internal thread part 21 is connected thereto.

When the flange part 22 has a discoidal shape, a predetermined dimension in accordance with a strength classification of the bolt 52 is set for the diameter of the flange part 22.

As one of references, it is preferable that the diameter of the flange part 22 be at least six times larger than the diameter of the bolt 52. For example, when the bolt 52 is M10 (for application to a floor of a vehicle), the diameter of the flange part 22 is greater than or equal to 60 mm (=6×10 mm). Further, when the bolt 52 is M2 (for application to a hand tool), the diameter of the flange part 22 is greater than or equal to 12 mm (=60×(2/10) mm) based on the case where the bolt 52 is M10 as a reference.

Note that these numerical values are mere examples of the reference and can be changed as appropriate in accordance with the strength classification or the like of the bolt 52.

Note that the flange part 22 illustrated in FIG. 5 to FIG. 7 has a discoidal shape but may have other shapes (for example, a polygonal planar shape).

Each erected part 23 is a portion erected from the flange face 22a in a direction of the axis X.

The erected parts 23 illustrated in FIG. 5 to FIG. 7 are shaped in ribs extending from the internal thread part 21 in radial directions about the axis X. The rib-like erected part 23 is also referred to as "the rib part 23" below.

Each base end of the rib part 23 is connected to the internal thread part 21, and each tip thereof is located at the circumference of the flange part 22.

A plurality of rib parts 23 are provided in the circumferential direction about the axis X and arranged radially about the internal thread part 21.

A predetermined dimension in accordance with a strength classification of the bolt 52 is set for the rib part 23.

As one of references, when the bolt 52 is M10, the number of rib parts 23 is six, the height of the rib part 23 is 10 mm, and the thickness thereof is 3 mm. Further, when the bolt 52 is M2, the height of the rib part 23 is 2 mm, and the thickness thereof is 0.6 mm based on a case where the bolt 52 is M10 as a reference.

Note that these numerical values are mere examples of the reference and can be changed as appropriate in accordance with the strength classification or the like of the bolt 52. For example, the height of the rib part 23 may be changed in the radial direction.

The nut part 20 configured as described above is manufactured by general metal machining such as cutting machining or casting machining or metal AM molding, for example.

Figure 8:
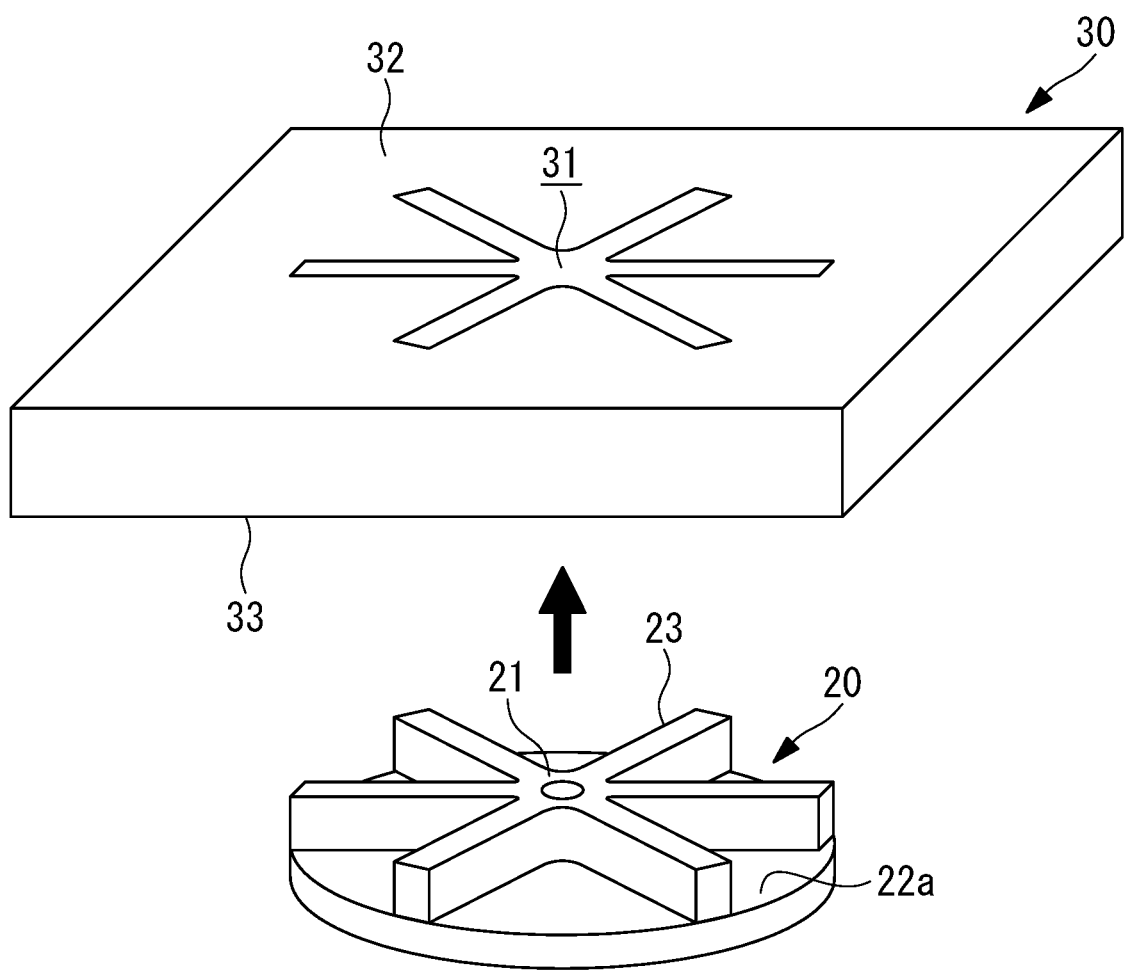
FIG. 8 is a perspective view illustrating an example of manufacturing of a fastener.

As illustrated in FIG. 8, the body 30 is a plate-like member where an insertion space 31 in which the internal thread part 21 and the erected parts 23 of the nut part 20 are inserted is formed.

The insertion space 31 corresponds to the shape of the internal thread part 21 and the erected part 23 of the nut part 20.

In the nut part 20 and the body 30 as described above, the nut part 20 is inserted in the insertion space 31 from the bottom face 33 of the body 30 to form the fastener 10 (see FIG. 1).

Figure 9:
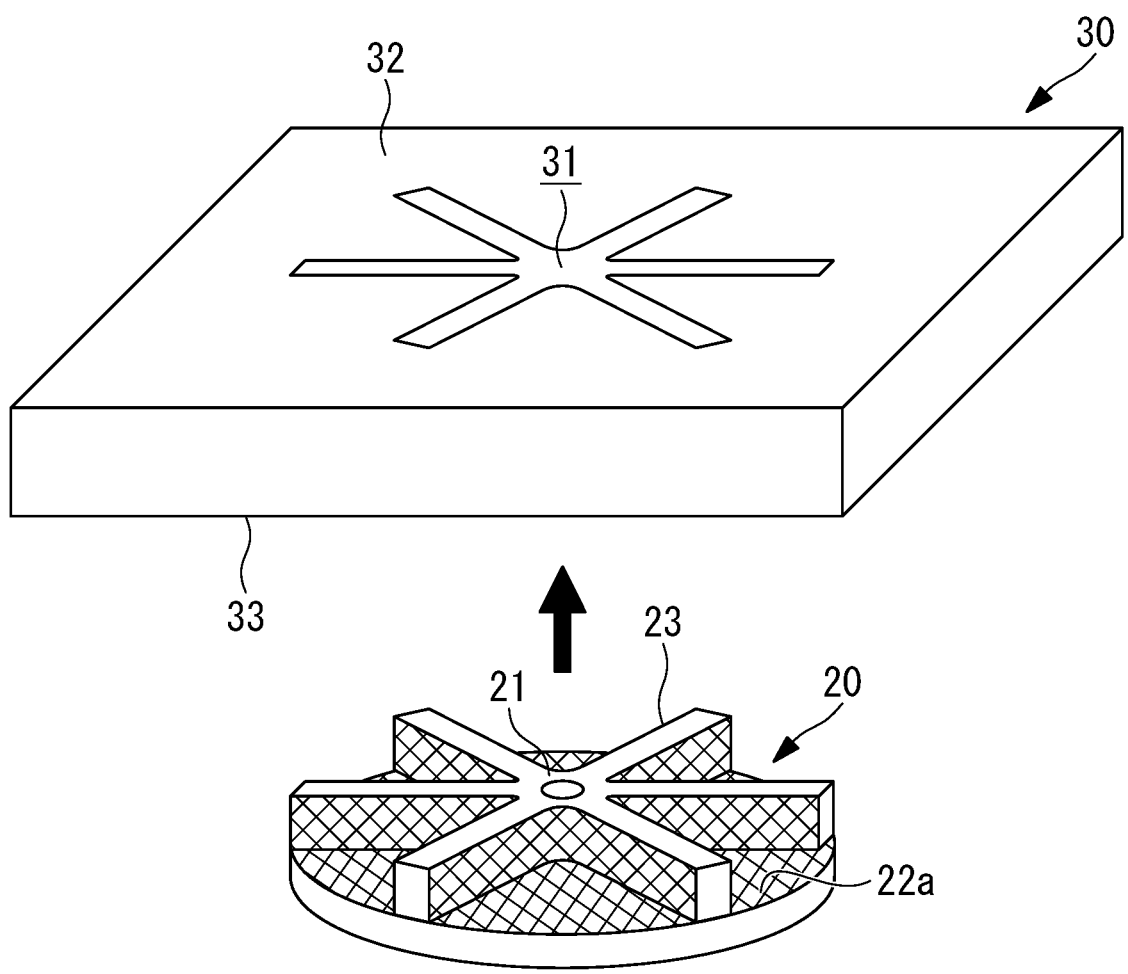
FIG. 9 is a perspective view illustrating an example of manufacturing of a fastener.

Note that, as illustrated in FIG. 9, an adhesive agent may be applied to the flange face 22a and the side faces of the rib parts 23 before the nut part 20 is inserted in the body 30. This allows the nut part 20 and the body 30 to be tightly joined to each other to decrease falling or unsteadiness of the nut part 20.

Figure 10:
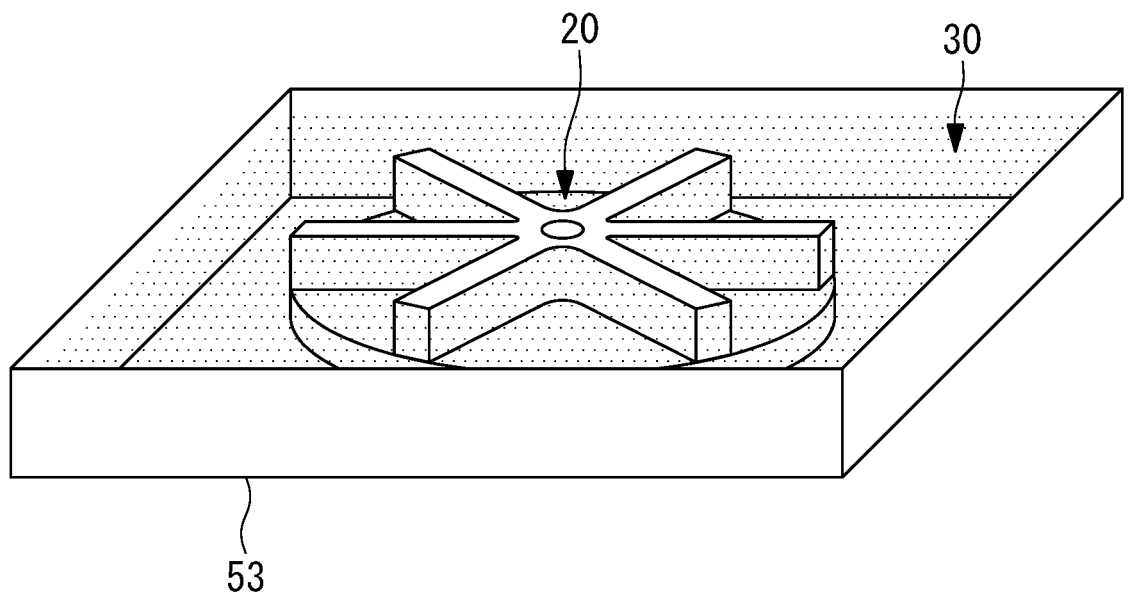
FIG. 10 is a perspective view illustrating an example of manufacturing of a fastener.

Further, as illustrated in FIG. 10, a melted resin may be injected into a mold 53 in which the nut part 20 is accommodated (insert molding). This results in formation of the body 30 with good dimensional accuracy.

Figure 11:
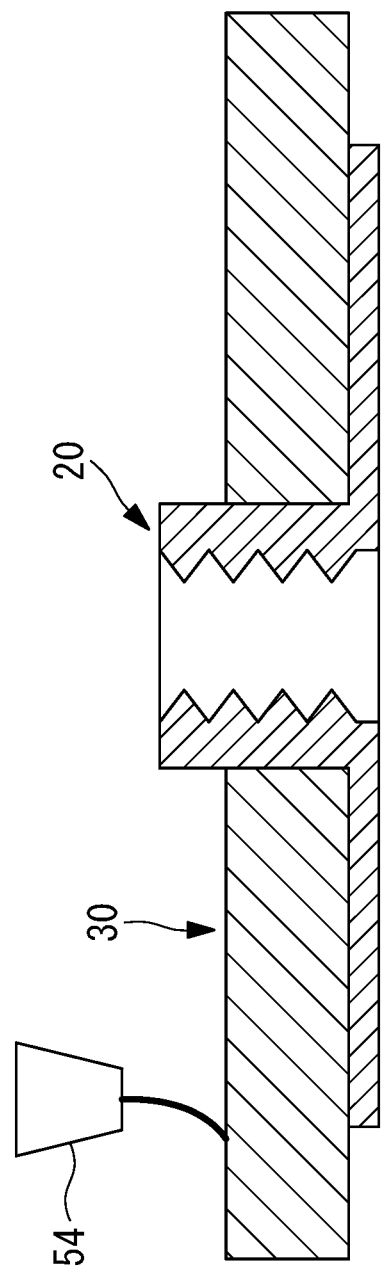
FIG. 11 is a perspective view illustrating an example of manufacturing of a fastener.

Further, as illustrated in FIG. 11, the body 30 may be directly AM-molded to the nut part 20 by using a 3D printer 54. This can reduce production lead time or man-hour.

In the fastener 10 configured as described above, the flange part 22 of the nut part 20 functions as follows.

Figure 12:
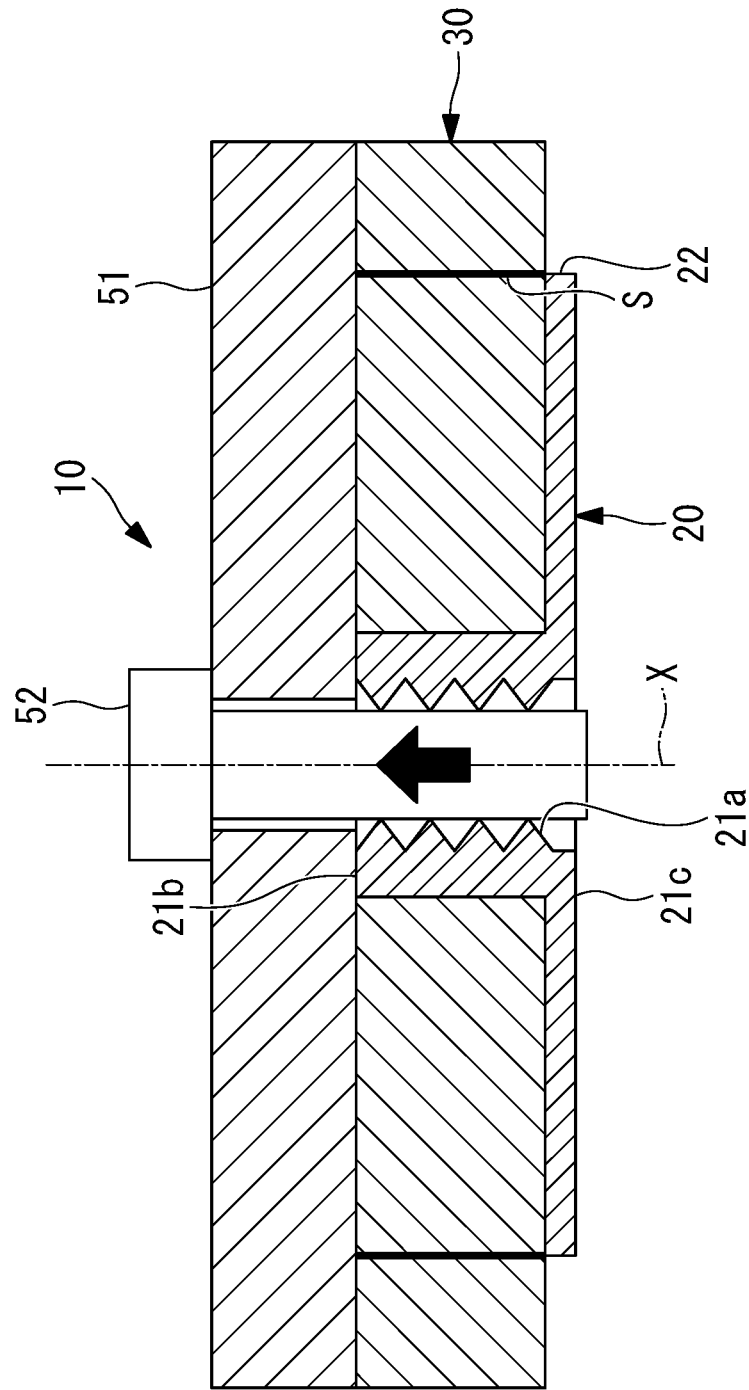
FIG. 12 is a diagram illustrating a longitudinal sectional view of a fastening structure.

As illustrated in FIG. 12, the flange part 22 can bear, together with the body 30, force (pull-out load) acting in a direction in which the nut part 20 is pulled from the body 30 in the direction of the axis X.

Accordingly, it is possible to increase the area of a shear plane S of the body 30 on which shear force received by the body 30 from the flange part 22 acts, and it is thus possible to decrease shear fracture of the body 30.

Note that the pull-out load is caused by axis tension of the bolt 52 screwed from one end 21b to the other end 21c.

Further, the expression "a direction in which the nut part 20 is pulled from the body 30" as used herein is a direction from the other end 21c to one end 21b of the internal thread part 21. This is obvious in consideration of the screwing direction (insertion direction) of the bolt 52.

Figure 13:
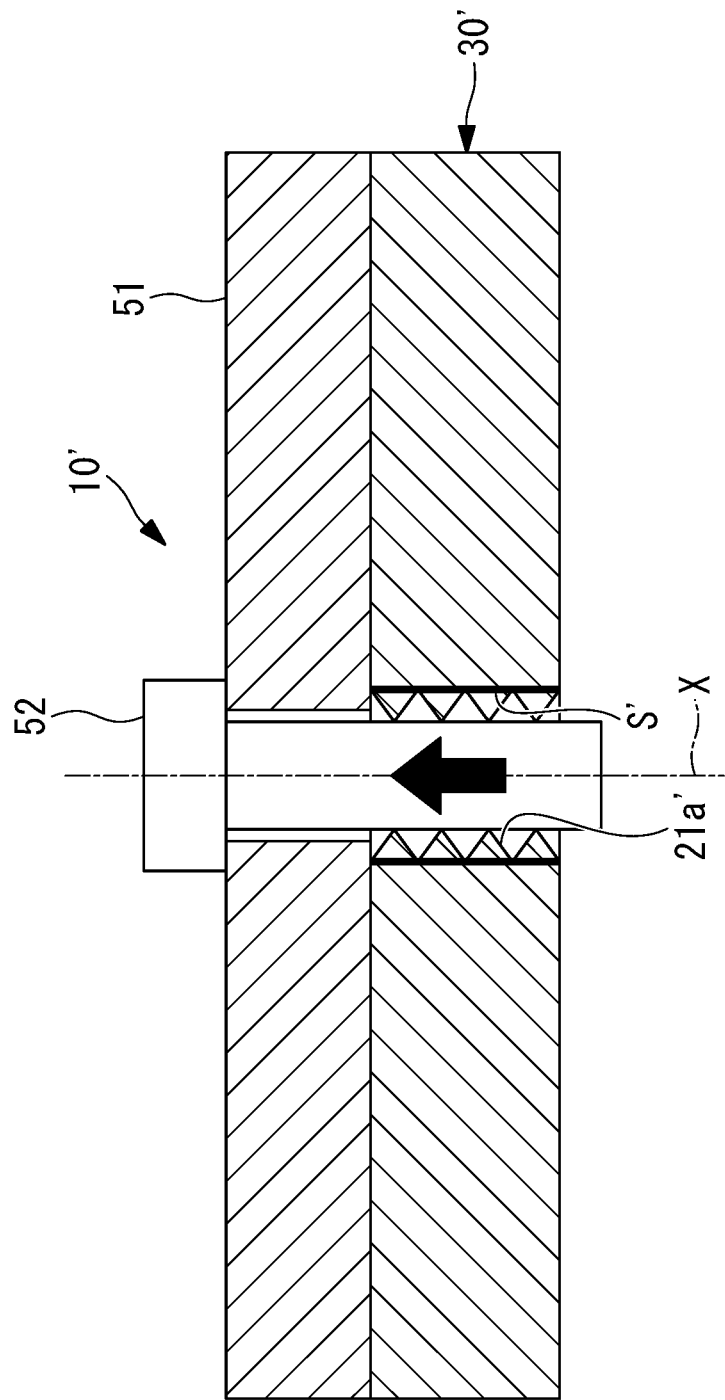
FIG. 13 is a diagram illustrating a longitudinal sectional view of a fastening structure according to a comparative example.

FIG. 13 illustrates a fastener 10' as a comparative example.

The fastener 10' does not have a member corresponding to the nut part 20. Further, the bolt 52 is directly screwed into an internal thread 21a' formed in a body 30'.

In such a case, the position of a shear plane S' in the radial direction is closer to the axis X side than the position of the shear plane S in the radial direction. Accordingly, the area of the shear plane S' of the body 30' is smaller than the area of the shear plane S of the body 30.

Further, in the fastener 10, the rib parts 23 of the nut part 20 function as follows.

The rib part 23 can bear, together with the body 30, torque generated in fastening of the bolt 52. Accordingly, slip of the nut part 20 and damage of the body 30 due to the slip can be avoided.

Note that needless to say, when the rib part 23 (the erected part 23) is more spaced apart from the axis X in the radial direction, force acting on the rib part 23 (the erected part 23) due to the torque will be smaller.

[Method of Designing Fastener]

A method of designing the fastener 10 will be described.

Figure 14:
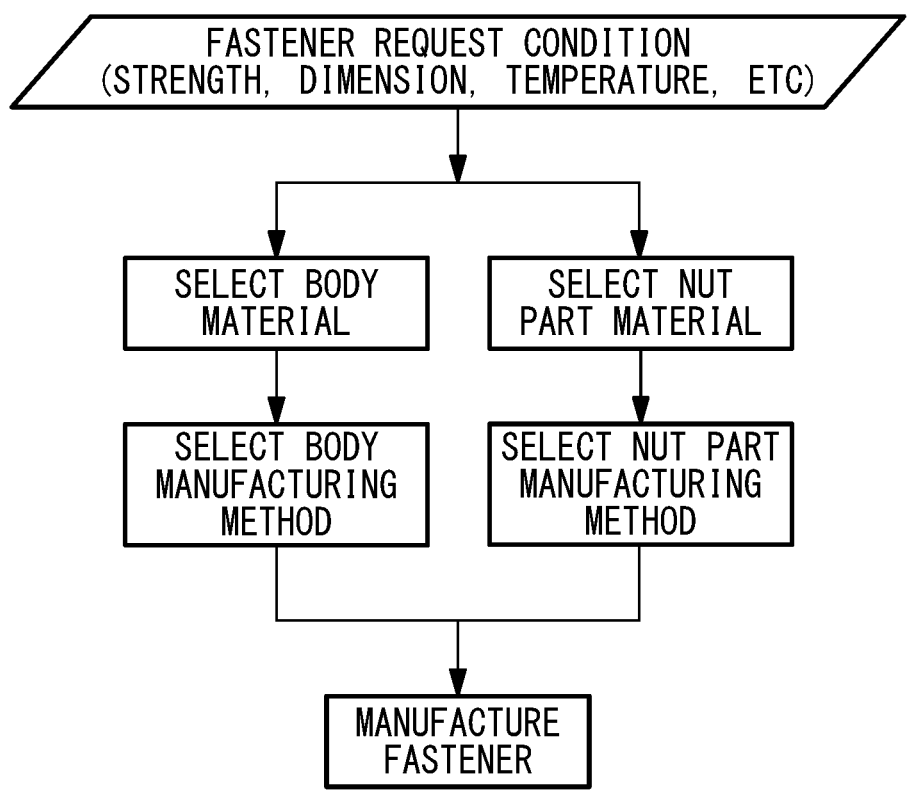
FIG. 14 is a diagram illustrating a flow of a method of designing a fastener.

As illustrated in FIG. 14, first, conditions (parameters) required for the fastener 10 are derived. Herein, a parameter may correspond to a required strength, dimensional restriction, a heat resisting temperature, or the like.

Note that a specific numerical value range of each parameter is determined by the specification of the fastening structure 1.

Next, the fastener 10 is considered by separating the fastener 10 into the nut part 20 and the body 30.

Specifically, for the nut part 20, a material and a molding method that meet conditions required for the fastener 10 are selected. At the same time, for the body 30, a material and a molding method that meet conditions required for the fastener 10 are selected.

Finally, the fastener 10 is manufactured by using the nut part 20 and the body 30 for which the materials and the molding methods have been selected as described above.

Modified Example 1

Figure 15:
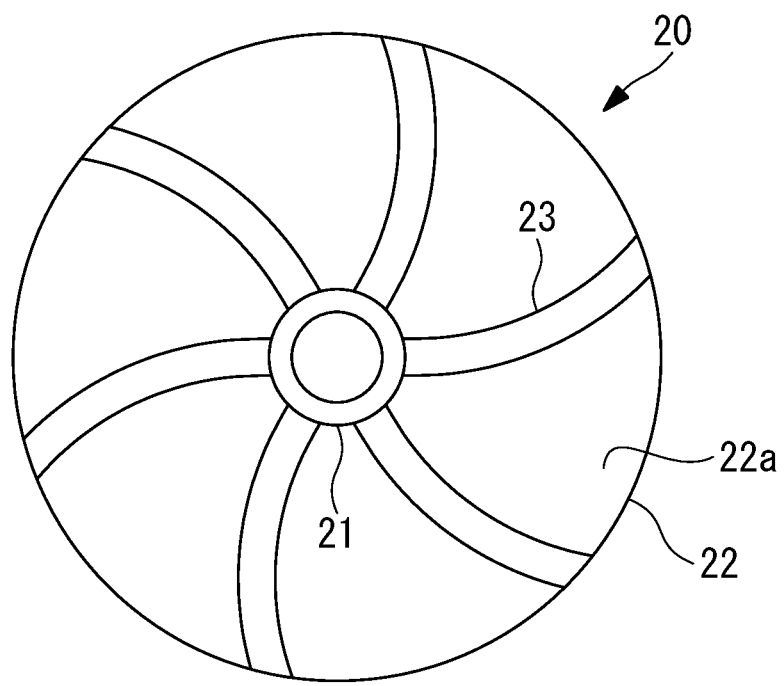
FIG. 15 is a plan view of a nut part according to Modified example 1.

The rib part 23 is not limited to a rib shaped straight as illustrated in FIG. 6 and may have a shape having a curvature as illustrated in FIG. 15.

Modified Example 2

Although the rib-like erected part 23 has been described as an example so far, the shape of the erected part 23 is not limited thereto. In detail, it is only required that the portion on which torque is loaded from the body 30 be formed as the erected part 23 at a position spaced apart from the internal thread part 21 in the radial direction.

Figure 16:
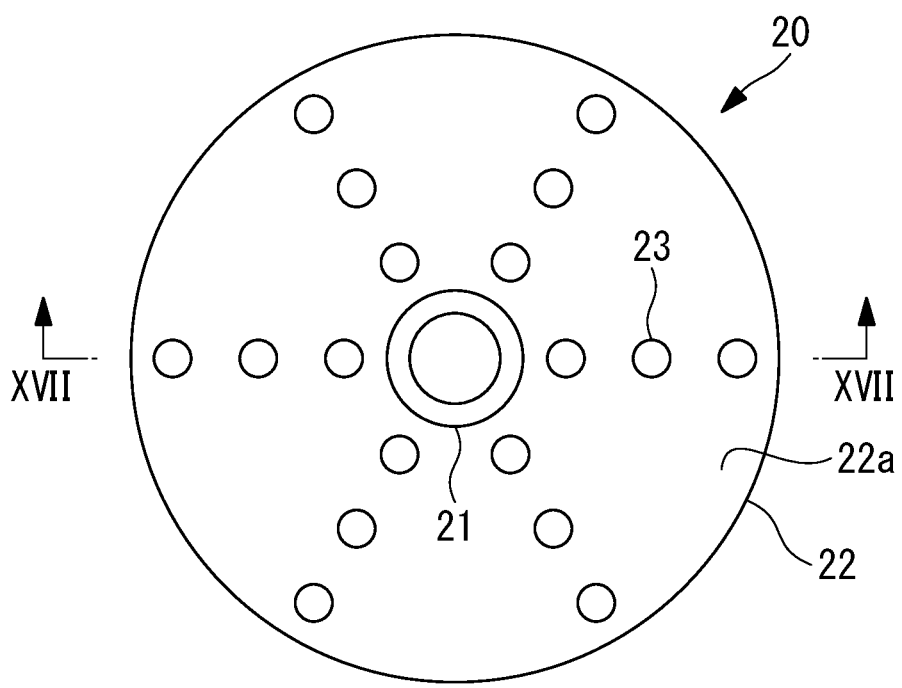
FIG. 16 is a plan view of a nut part according to Modified example 2.
Figure 17:
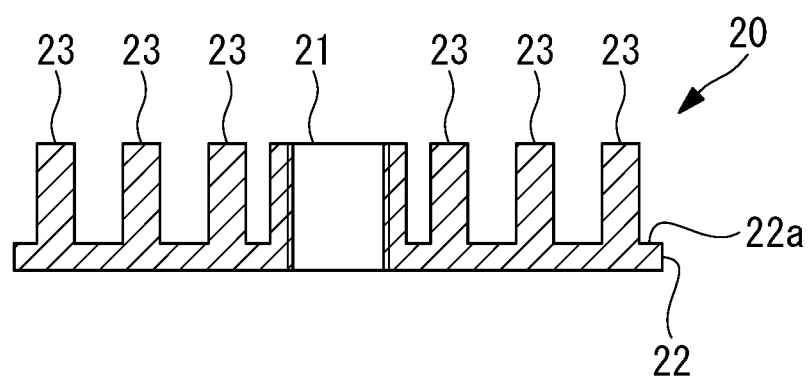
FIG. 17 is a longitudinal sectional view taken along a cutting line XVII-XVII illustrated in FIG. 16.

For example, as illustrated in FIG. 16 and FIG. 17, instead of the rib-like erected parts 23, erected parts 23 formed of a plurality of protrusions may be employed.

In the present embodiment, the following effects and advantages are achieved.

The fastener 10 has the metal nut part 20 and the resin body 30 in which the nut part 20 is inserted. Thus, the strength of the fastener 10 can be partially ensured due to the metal nut part 20, and the weight of the fastener 10 can be reduced due to the resin body 30.

Further, the nut part 20 has a plate-like flange part 22 connected to the side of the other end 21c of the internal thread part 21 and having the flange face 22a perpendicular to the axis X, and the internal thread part 21 is inserted in the body 30. Thus, force (pull-out load) acting in the direction in which the nut part 20 is pulled from the body 30 can be supported by the flange part 22 and the body 30 together. Accordingly, it is possible to increase the area of the shear plane S of the body 30 on which shear force received by the body 30 from the flange part 22 acts, and it is thus possible to decrease shear fracture of the body 30. Note that the pull-out load is caused by axis tension of the fastened bolt 52, for example. This causes the pull-out load to act in the direction from the other end 21c to one end 21b of the internal thread part 21.

Further, the nut part 20 has the erected part 23 arranged at a position spaced apart from the internal thread part 21 in the radial direction about the axis X and erected in the direction of the axis X from the flange face 22a, and the erected part 23 is inserted in the body 30. Thus, torque generated in fastening of the bolt 52 can be supported by the body 30 and the erected part 23 together. Accordingly, slip of the nut part 20 and damage of the body 30 due to the slip can be avoided.

Further, the nut part 20 has the rib part 23 erected in the direction of the axis X from the flange face 22a and extending in the radial direction from the internal thread part 21, and the erected part 23 is included in the rib part 23. Thus, the torque generated in fastening of the bolt 52 can be supported by the rib part 23 and the body 30 together.

Further, since a plurality of rib parts 23 are provided in the circumferential direction about the axis X, force acting due to the torque can be dispersed to respective rib parts 23.

Further, the flange part 22 has a discoidal shape having the diameter that is at least six times larger than the diameter of the bolt 52, and the internal thread part 21 is located at substantially the center of the flange part 22. It is thus possible to sufficiently increase the area of the shear plane S of the body 30 on which shear force received by the body 30 from the flange part 22 acts.

Further, the fastening structure 1 includes the fastener 10 in which a plurality of nut parts 20 are inserted in the body 30, a plurality of panels 51 arranged on the fastener 10, and a plurality of bolts 52, and one of the panels 51 are fastened to one of the nut parts 20 by one of the bolts 52. It is thus possible to integrate the plurality of panels 51 by using the fastener 10. In this structure, since a part of the fastener 10 is the resin body 30, the weight of the fastening structure 1 can be reduced.

The fastener, the fastening structure, and the method of designing a fastener according to the present embodiment described above are understood as follows, for example.

A fastener (10) according one aspect of the present disclosure includes: at least one metal nut part (20) into which a bolt (52) is screwed along an axis (X); and a resin body (30) in which the nut part is inserted, and the nut part includes an internal thread part (21) into which the bolt is screwed from one end (21b) to another end (21c), a plate-like flange part (22) connected to a side of the other end of the internal thread part and having a flange face (22a) perpendicular to the axis, and at least one erected part (23) arranged at a position spaced apart from the internal thread part in a radial direction about the axis and erected in a direction of the axis from the flange face, and the internal thread part and the erected part of the nut part are inserted in the body.

According to the fastener of the present aspect, since the fastener has the metal nut part and the resin body in which the nut part is inserted, the strength of the fastener can be partially ensured due to the metal nut part, and the weight of the fastener can be reduced due to the resin body.

Further, since the nut part has a plate-like flange part connected to the other end of the internal thread part and having a flange face perpendicular to the axis and the internal thread part is inserted in the body, force (pull-out load) acting in the direction to which the nut part is pulled from the body can be supported by the flange part and the body together. Accordingly, it is possible to increase the area of a shear plane (S) of the body on which shear force received by the body from the flange part acts, and it is thus possible to decrease shear fracture of the body. Note that the pull-out load is caused by axis tension of the fastened bolt, for example. Thus, the pull-out load acts in the direction from the other end to one end of the internal thread part.

Further, the nut part has the erected part arranged at a position spaced apart from the internal thread part in the radial direction about the axis and erected in a direction of the axis from the flange face, and the erected part is inserted in the body. Thus, torque generated in fastening of the bolt can be supported by the erected part and the body together. Thus, slip of the nut part and damage of the body due to the slip can be avoided.

Further, in the fastener according to one aspect of the present disclosure, the nut part has at least one rib part (23) erected in the direction of the axis from the flange face and extending in the radial direction from the internal thread part, and the erected part is included in the rib part.

According to the fastener of the present aspect, the nut part has the rib part erected in the direction of the axis from the flange face and extending in the radial direction from the internal thread part, and the erected part is included in the rib part. Thus, the torque generated in fastening of the bolt can be supported by the rib part and the body together.

Further, in the fastener according to one aspect of the present disclosure, a plurality of rib parts are provided in a circumferential direction about the axis.

According to the fastener of the present aspect, since a plurality of rib parts are provided in a circumferential direction about the axis, force acting due to the torque can be dispersed to respective rib parts.

Further, in the fastener according to one aspect of the present disclosure, the flange part has a discoidal shape having a diameter that is at least six times larger than the diameter of the bolt, and the internal thread part is located at substantially the center of the flange part.

According to the fastener of the present aspect, the flange part has a discoidal shape having the diameter that is at least six times larger than the diameter of the bolt, and the internal thread part is located at substantially the center of the flange part. It is therefore possible to sufficiently increase the area of a shear plane of the body on which shear force received by the body from the flange part acts.

Further, a fastening structure according to one aspect of the present disclosure includes: the fastener in which a plurality of nut parts are inserted in the body; a plurality of panels (51) arranged on the fastener; and a plurality of bolts, and one of the plurality of panels is fastened to one of the plurality of nut parts by one of the plurality of bolts.

According to the fastening structure of the present aspect, the fastener includes: the fastener in which the plurality of nut parts are inserted in the body; the plurality of panels arranged on the fastener; and the plurality of bolts, and one of the plurality of panels is fastened to one of the plurality of nut parts by one of the plurality of bolts, it is therefore possible to integrate the plurality of panels by using the fastener. In this structure, since a part of the fastener is the resin body, the weight of the fastening structure can be reduced.

Further, in the fastening structure according to one aspect of the present disclosure, the panels form a floor panel of a vehicle.

Further, in the fastening structure according to one aspect of the present disclosure, the panels form a cover panel of electric equipment of a manipulator.

Further, a method of designing the fastener according to one aspect of the present disclosure includes steps of: deriving a parameter required for the fastener; selecting a metal material and a molding method for the nut part that meet the parameter; and selecting a resin material and a molding method for the body that meet the parameter.

LIST OF REFERENCE SYMBOLS 1 fastening structure
10 fastener
20 nut part
21 internal thread part
21a internal thread
21b one end
21c another (the other) end
22 flange part
22a flange face
23 erected part (rib part)
30 body
31 insertion space
32 top face
33 bottom face
51 panel
52 bolt
53 mold
54 3D printer

What is claimed is:

1. A fastener comprising:
   at least one metal nut part into which a bolt is screwed along an axis; and
   a resin body in which the nut part is inserted,
   wherein the nut part includes
   an internal thread part into which the bolt is screwed from one end to another end,
   a flange part connected to a side of the other end of the internal thread part and having a flange face perpendicular to the axis, and
   at least one erected part arranged at a position spaced apart from the internal thread part in a radial direction about the axis and erected in a direction of the axis from the flange face, and wherein the internal thread part and the erected part of the nut part are inserted in the body.

2. The fastener according to claim 1, wherein the nut part includes at least one rib part erected in the direction of the axis from the flange face and extending in the radial direction from the internal thread part, and wherein the erected part is included in the rib part.

3. The fastener according to claim 2, wherein a plurality of rib parts are provided in a circumferential direction about the axis.

4. The fastener according to claim 1, wherein the flange part has a discoidal shape having a diameter that is at least six times larger than a diameter of the bolt, and wherein the internal thread part is located at substantially a center of the flange part.

5. A fastening structure comprising:

the fastener according to claim 1 in which a plurality of nut parts are inserted in the body;

a plurality of panels arranged on the fastener; and a plurality of bolts, wherein one of the plurality of panels is fastened to one of the plurality of nut parts by one of the plurality of bolts.

6. The fastening structure according to claim 5, wherein the panels form a floor panel of a vehicle.

7. The fastening structure according to claim 5, wherein the panels form a cover panel of electric equipment of a manipulator.

8. A method of designing the fastener according to claim 1, the method comprising:

deriving a parameter required for the fastener;

selecting a metal material and a molding method for the nut part that meet the parameter; and selecting a resin material and a molding method for the body that meet the parameter.

* * * * *